H. W. WILKE.
LOOM GAGE.
APPLICATION FILED FEB. 14, 1911.

1,003,841.

Patented Sept. 19, 1911.

2 SHEETS—SHEET 1.

Witnesses
Chas. C. Richardson
S. W. Cook

Inventor
Hermann W. Wilke,
By Wm. C. McIntire
Attorney

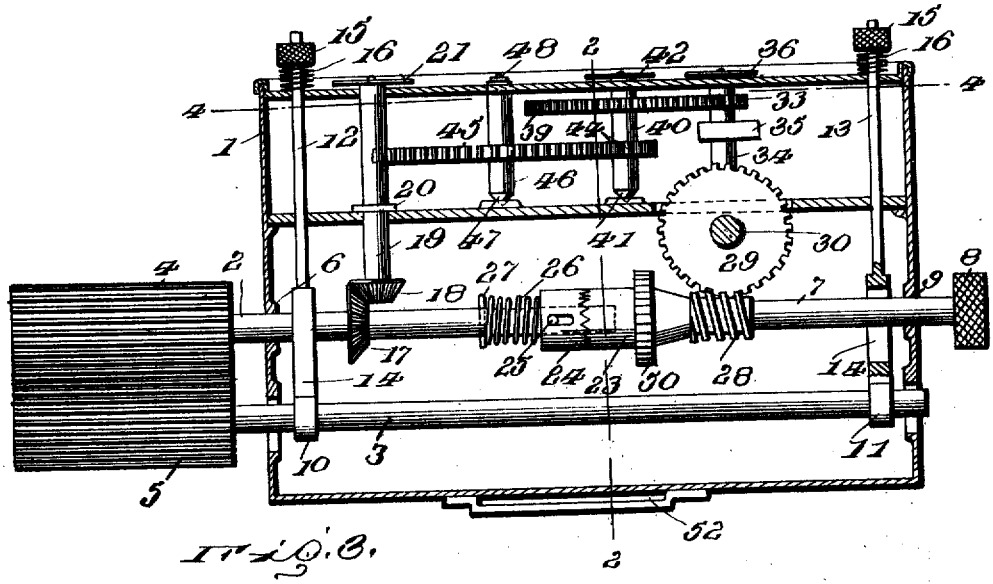
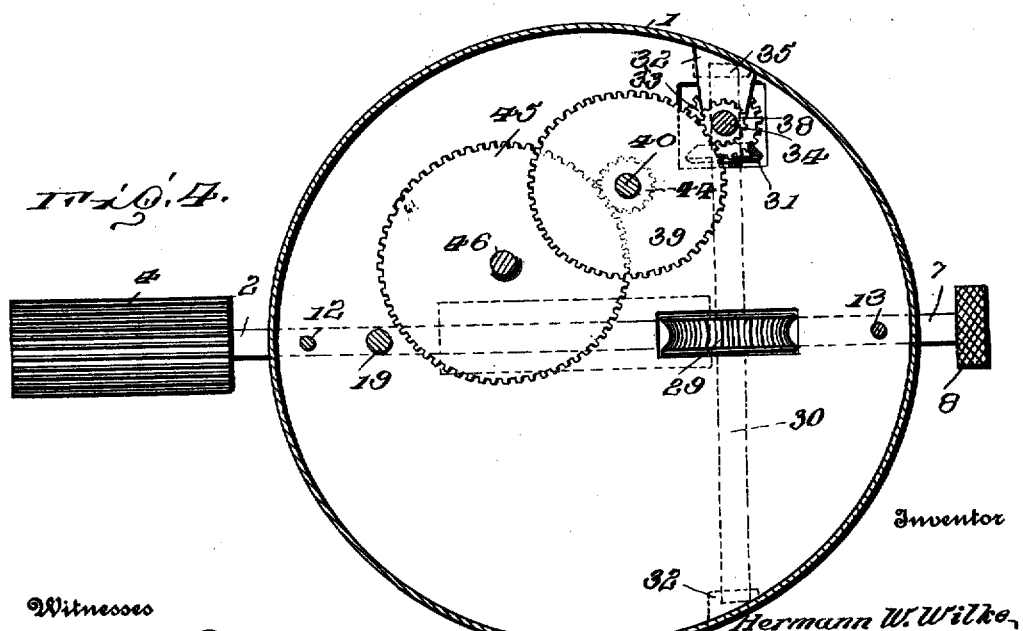

UNITED STATES PATENT OFFICE.

HERMANN W. WILKE, OF STIRLING, NEW JERSEY.

LOOM-GAGE.

1,003,841.  Specification of Letters Patent.  Patented Sept. 19, 1911.

Application filed February 14, 1911. Serial No. 608,573.

*To all whom it may concern:*

Be it known that I, HERMANN W. WILKE, a subject of the Emperor of Germany, residing at Stirling, in the county of Morris and State of New Jersey, have invented certain new and useful Improvements in Loom-Gages; and I do hereby declare the following to be a full, clear, and exact description of the invention, such as will enable others skilled in the art to which it appertains to make and use the same.

This invention relates to improvements in loom gages such as are used to record the amount of material that passes through a loom or similar machine. It is customary to place such gages between the reed and first roller of a loom, the instrument being fastened to some convenient support, and the knurled heads engaging the edge of the work. The material passing between the knurled heads cause them to rotate and consequently operate the instrument. In the common type of gage a single dial is provided on which revolves a pointer directly connected through suitable gearing to one of the knurled heads, thus enabling the operator by observation or use of a watch to determine the rate the machine operates at.

The object of the invention is to improve such instruments by the addition of a device that will record or meter the quantity of work passing between the knurled heads, thus keeping accurate count of the production of each machine and enabling the operators to adjust them accordingly.

With the above and other objects in view the invention resides in the novel features of construction, formation, combination and arrangements of parts to be hereinafter more fully described, claimed and illustrated in the accompanying drawings, in which—

Figure 1:
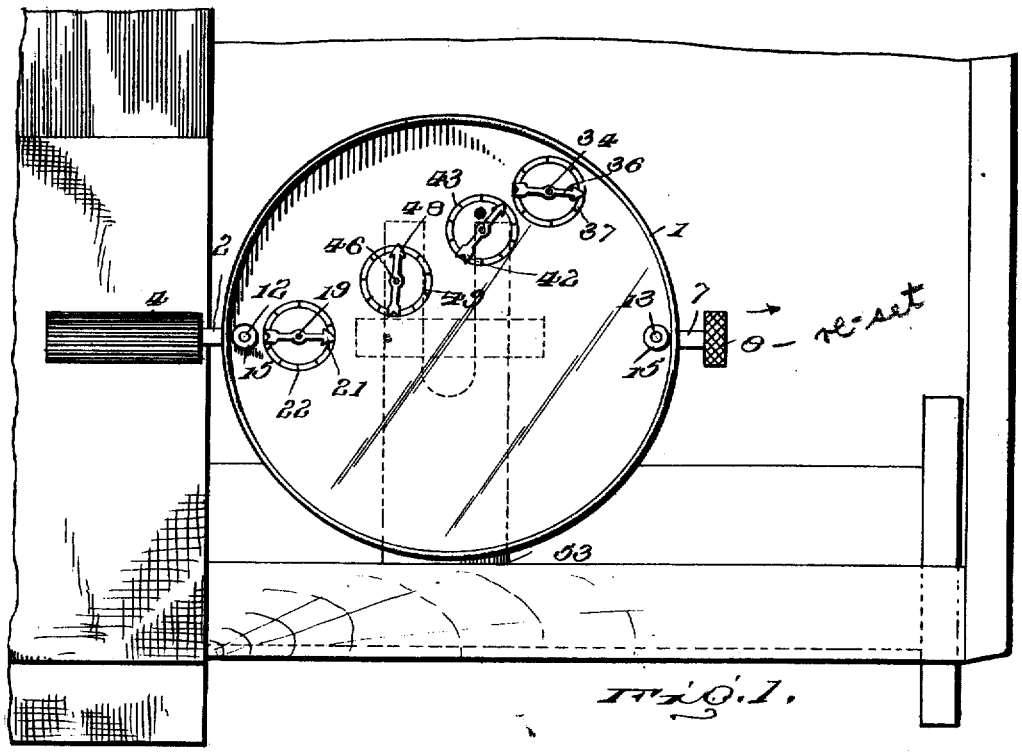
Figure 2:
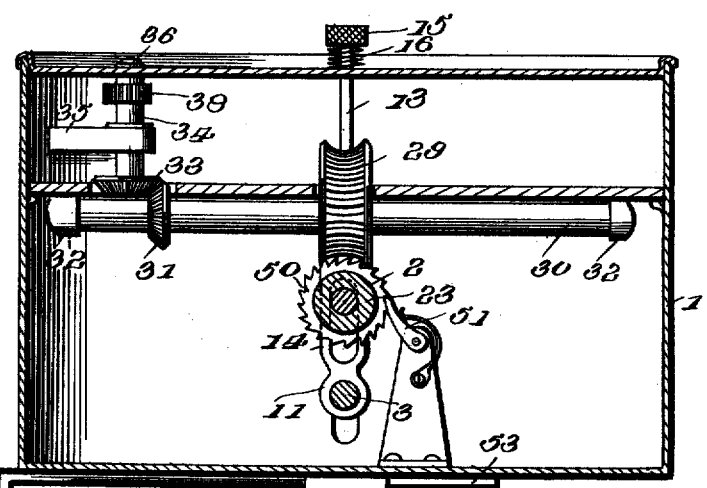

Figure 1 is a top elevation of the device as applied to a loom; Fig. 2 is a partial vertical section on the line 2—2 of Fig. 3; Fig. 3 is a side view of the device with one-half of the casing broken away, and Fig. 4 is a horizontal view of the device on the line 4—4 of Fig. 3.

Referring to the drawings by characters of reference, numeral 1 represents a frame or suitable casing, in which is mounted the mechanism of the instrument. Extending outside the casing are two parallel shafts 2 and 3, having mounted on their ends the knurled or ribbed heads or rollers 4 and 5. The work to be measured, passes between these two heads, thereby causing them to be rotated and thus operating the indicating and registering mechanism. The shaft 2 is journaled at 6 in a suitable bearing fastened to the casing, the other or inner end of the shaft fitting loosely within a hole drilled within the enlarged end of a shaft 7, which extends on out through the opposite side of the casing, terminating in a knob or handle 8, the shaft being journaled at 9 where it passes through the casing. The lower shaft 3 passes through vertical slots in the casing and is journaled at 10 and 11 in the lower ends of the rods 12 and 13, which are provided with openings 14 to pass around the shafts 2 and 7, the upper ends passing through the top of the casing terminating in threaded ends on which are placed adjusting nuts 15, springs 16 being interposed between the casing and the nuts 15, to allow a greater flexibility in the mounting of the shaft.

It will be seen from the foregoing that the distance between the knurled heads can be varied by adjusting the nuts 15, thus allowing the use of the instrument on different thicknesses of material, the springs 16 being interposed to allow a slight flexibility in the adjustment. A bevel gear 17 is mounted on the shaft 2 and meshes with a bevel gear 18, mounted on the lower end of a vertical shaft 19, which is supported in suitable bearing 20, and has attached to its upper end a pointer 21, which rotates on a properly graduated dial 22 attached to the top of the casing.

On the inner or enlarged end of the shaft 7 is formed a clutch member 23, which engages with a corresponding member 24 slidably mounted on the shaft 2. The slidable clutch member is held on the shaft by a pin 25, passing through a slot in the clutch and a hole in the shaft, the clutch being held in its engaging position by means of a coil spring 26, surrounding the shaft and retained by a pin 27.

Mounted on the shaft 7 near its middle is worm 28, engaging with a gear 29 mounted one one end of a horizontal shaft 30, which terminates at its other end in a beveled gear 31, the shaft 30 being suitably mounted in a bearing 32. The bevel gear 31, engages with a similar bevel gear 33, mounted on the lower end of a vertical shaft 34, suitably supported in a bearing 35 and terminating at its upper end in a pointer 36, which rotates on a dial 37, the circumference of which indicates one yard and is divided into eighths. The intermediate gearing being designed so that when one yard of material has passed between the shaft 7, the pointer 36 will have made one complete revolution.

Mounted at an intermediate point on the shaft 34, is a pinion 38, engaging with a gear 39, mounted on a vertical shaft 40, suitably journaled at 41 and terminating at its upper end in a pointer 42, which rotates on a dial 43. This dial is graduated from zero to 10. The pointer by means of a ten to one ratio in the gears 38 and 39 makes one complete revolution for every ten revolutions of the pointer 36.

Mounted at an intermediate point on the shaft 40, is a pinion 44, which engages with the gear 45, mounted on a vertical shaft 46, suitably journaled at 47 and terminating at its upper end in a pointer 48 which rotates on a dial 49. This dial is graduated in tens from zero to one hundred and the pointer 48 by means of a ten to one ratio in the gears 44 and 45 makes one complete revolution, for every one hundred revolutions of the pointer 36. A ratchet 50 is mounted on a shaft 7 and is engaged by a spring retained pawl 51, thus preventing any backward motion of the entire mechanism. An opening 52 is formed on the bottom of the casing 1 to provide for its easy removal from a bracket 53, one end of which slips into this opening, the other end being fastened to some convenient support.

It will be seen from the foregoing that by pulling out on the knob 8 so as to disengage the clutch member without disengaging the worm 28 from the gear 29 the knob may be rotated in a forward direction independent of the knurled head and thus reset the instrument for the beginning of a new run or for any other purpose.

Having thus fully described my invention what I claim as new and desire to secure by Letters Patent is:

1. A loom gage, such as described, consisting of a casing, two parallel shafts passing through the casing and terminating at one end in knurled heads, the upper shaft fixed in suitable bearings and the lower shaft journaled in the ends of vertical rods, which extend up through the top of the casing and are vertically adjustable with reference to same so as to regulate the distance between the knurled heads.

2. A loom gage such as described, consisting of a casing, two parallel shafts terminating outside the casing in knurled heads, the upper shaft being fixed in suitable bearings, the lower shaft journaled in the ends of vertical rods, which extend up through the top of the casing, nuts fitted on the threaded upper ends of the rods, and coil springs placed on the rods between the nuts and the casing so as to allow a flexible adjustment of the knurled heads.

3. A loom gage such as described, consisting of a casing, two parallel shafts mounted in the casing and knurled heads mounted on the ends of the shafts extending outside the casing, the lower shaft vertically adjustable with respect to the upper shafts, and the upper shaft composed of two parts, the end of one loosely fitting within the end of the other and a positive clutch member on each of the said sections to allow of the locking together of said sections.

4. A loom gage such as described, consisting of a casing, two parallel shafts passing through the casing terminating at one end in knurled heads, the upper of said shafts composed of two sections, the end of one fitting loosely within the end of the other section, and the said sections of the shaft normally fastened together by a spring engaged clutch.

5. A loom gage such as described, consisting of a casing, two parallel shafts passing through the casing, terminating at one end in knurled heads, the upper of said shafts composed of two sections, one section having on its end a knurled head, the other end of this section engaging the inner end of the other section by means of a spring clutch, and a spring pressed pawl engaging a ratchet wheel mounted on the latter section to allow rotation in one direction only.

6. A loom gage such as described, consisting of a casing, two parallel shafts passing through the casing and having knurled heads for engaging with the fabric to be measured mounted on one end, the upper of said shafts composed of two sections connected by a spring engaging clutch, and the section capable of being disengaged, having mounted thereon a worm which drives a train of gearing by means of which pointers are driven, which register the amount of material passing through the knurled heads.

7. A loom gage such as described, consisting of a casing, two shafts passing through the casing and having knurled heads mounted on one end, the upper of said shafts consisting of two sections joined by a spring engaging clutch, one of the said knurled heads being mounted on one of these sections, a worm gear mounted on the other section for driving a train of gears to operate registering dials, and a knob or handle mounted on the extremity of this latter section by means of which this section may be disengaged from the other section without disengaging the worm from the train of gears.

8. A loom gage such as described, consisting of a casing, two shafts passing through said casing, knurled heads mounted on one end of the shafts for engaging the material to be measured, the lower shaft vertically adjustable with respect to the upper shaft, the said upper shaft composed of two sections joined by a spring engaged clutch, one section having mounted on its outer end, one of the said knurled heads, the other section having mounted thereon a worm for driving a train of gearing to operate the registering dials, spring pressed pawl engaging a ratchet wheel mounted on this same section to allow rotation in one direction only, a knob attached to the end of this section for disengaging the same from the other section, and a bevel gear mounted on the section on which the knurled head is mounted for driving a vertical shaft having mounted thereon an indicating pointer.

In testimony whereof I affix my signature in presence of two witnesses.

HERMANN W. WILKE.

Witnesses:
FRANK M. MURPHY,
WILLIAM P. REINHARD.

Copies of this patent may be obtained for five cents each, by addressing the "Commissioner of Patents, Washington, D. C."